United States Patent
Baxter, Jr. et al.

(10) Patent No.: US 6,683,138 B2
(45) Date of Patent: Jan. 27, 2004

(54) PROCESS FOR PRODUCING HIGH VINYLIDENE POLYISOBUTYLENE

(75) Inventors: C. Edward Baxter, Jr., League City, TX (US); Gilbert Valdez, Pearland, TX (US); Christopher Lobue, Montgomery, TX (US); Timothy Lowry, Spring, TX (US)

(73) Assignee: Texas Petrochemicals LP, Houston, TX (US)

( * ) Notice: Subject to any disclaimer, the term of this patent is extended or adjusted under 35 U.S.C. 154(b) by 0 days.

(21) Appl. No.: 10/334,639

(22) Filed: Dec. 31, 2002

(65) Prior Publication Data

US 2003/0096924 A1 May 22, 2003

Related U.S. Application Data

(63) Continuation of application No. 09/515,790, filed on Feb. 29, 2000, now Pat. No. 6,562,913.
(60) Provisional application No. 60/154,263, filed on Sep. 19, 1999.

(51) Int. Cl.[7] .............................. C08F 4/14; C08F 10/10
(52) U.S. Cl. ........................... 526/88; 526/64; 526/237; 526/212; 526/348.7; 585/521; 585/525
(58) Field of Search ............................ 526/64, 88, 237, 526/348.7, 212; 585/521, 525

(56) References Cited

U.S. PATENT DOCUMENTS

| | | |
|---|---|---|
| 132,264 A | 10/1872 | Eames et al. |
| 2,139,038 A | 12/1938 | Russell |
| 2,379,656 A | 7/1945 | Ruthruff |
| 2,407,494 A | 9/1946 | Hartvigsen |
| 2,411,097 A | 11/1946 | Kopp |
| 2,559,062 A | 7/1951 | Domte |
| 2,559,984 A | 7/1951 | Montgomery et al. |
| 2,727,022 A | 12/1955 | Linsk |
| 2,833,840 A | 5/1958 | Longwell |
| 2,856,395 A | 10/1958 | Richard, Jr. et al. |
| 2,889,370 A | 6/1959 | Schechter |
| 2,918,508 A | 12/1959 | Coopersmith et al. |
| 3,024,226 A | 3/1962 | Nolan, Jr. |
| 3,166,546 A | 1/1965 | Nolan, Jr. |
| 3,284,537 A | 11/1966 | Webb, Jr. |
| 3,306,907 A | 2/1967 | McNinch |
| 3,346,354 A | 10/1967 | Kautsky et al. |
| 3,382,291 A | 5/1968 | Brennan |
| 3,634,383 A | 1/1972 | Miller, Jr. |
| 3,726,842 A | 4/1973 | Treischmann et al. |
| 3,778,487 A | 12/1973 | Driscoll et al. |
| 3,780,128 A | 12/1973 | Shubkin |
| 3,849,085 A | 11/1974 | Kreuz et al. |
| 3,927,041 A | 12/1975 | Cengel et al. |
| 3,935,249 A | 1/1976 | Puskas et al. |
| 3,991,129 A | 11/1976 | Daniels |
| 4,110,521 A | 8/1978 | Barnett et al. |
| 4,152,499 A | 5/1979 | Boerzel et al. |
| 4,227,027 A | 10/1980 | Booth et al. |
| 4,231,759 A | 11/1980 | Udelhofen et al. |
| 4,238,628 A | 12/1980 | Cahill et al. |
| 4,311,808 A | 1/1982 | Su |
| 4,383,093 A | 5/1983 | Shiraki et al. |
| 4,391,959 A | 7/1983 | Fauth et al. |
| 4,400,493 A | 8/1983 | Abernathy, Jr. et al. |
| 4,433,197 A | 2/1984 | Vogel et al. |
| 4,605,808 A | 8/1986 | Samson |
| 4,663,406 A | 5/1987 | Bronstert et al. |
| 4,691,072 A | 9/1987 | Schick et al. |
| 4,849,572 A | 7/1989 | Chen et al. |
| 4,883,847 A | 11/1989 | Leung et al. |
| 4,914,166 A | 4/1990 | Kennedy et al. |
| 4,943,616 A | 7/1990 | Mishra et al. |

(List continued on next page.)

FOREIGN PATENT DOCUMENTS

| | | |
|---|---|---|
| CA | 2195575 | 2/1996 |
| CA | 2217848 | 12/1996 |
| DE | 27 02 604 | 7/1978 |
| DE | 1592016 | 7/1981 |
| EP | 0 145 235 A1 | 6/1985 |
| EP | 0 279 456 A1 | 8/1988 |
| EP | 0 322 241 A1 | 6/1989 |
| EP | 0 355 997 A1 | 2/1990 |
| EP | 0 400 905 A1 | 12/1990 |
| EP | 0 481 297 A2 | 4/1992 |
| EP | 0 628 575 A1 | 12/1994 |
| EP | 0 671 419 A1 | 9/1995 |
| EP | 0 628 022 B1 | 11/1998 |
| GB | 1159368 | 7/1969 |
| WO | WO 93/10063 | 5/1993 |
| WO | WO 94/14739 | 4/1994 |

Primary Examiner—Fred Teskin
(74) Attorney, Agent, or Firm—James H. Marsh, Jr.; Stinson Morrison Hecker LLP

(57) ABSTRACT

A liquid phase polymerization process for preparing low molecular weight, highly reactive polyisobutylene. The process includes the steps of providing a feedstock containing isobutylene and a catalyst composition made up of a complex of $BF_3$ and a complexing agent. The feedstock and the catalyst composition are introduced into a residual reaction mixture in a reaction zone where the residual reaction mixture, the feedstock and the catalyst composition are intimately intermixed so as to present an intimately intermixed reaction admixture in said reaction zone. The intimately intermixed reaction admixture is maintained in its intimately intermixed condition and kept at a temperature of at least about 0° C. while the same is in the reaction zone, whereby the isobutylene therein is polymerized to form polyisobutylene having a high degree of terminal unsaturation. A product stream is withdrawn from the reaction zone. The introduction of feedstock into the reaction zone and the withdrawal of the product stream from the reaction zone are controlled such that the residence time of the isobutylene undergoing polymerization in the reaction zone is no greater than about 4 minutes whereby the product stream contains a low molecular weight, highly reactive polyisobutylene product. Preferably the reaction may be conducted on the tube side of a shell-and-tube exchanger in which a coolant is circulated on the shell side.

77 Claims, 1 Drawing Sheet

U.S. PATENT DOCUMENTS

| | | |
|---|---|---|
| 4,956,512 A | 9/1990 | Nissfolk et al. |
| 4,973,733 A | 11/1990 | Valkovich et al. |
| 4,982,042 A | 1/1991 | Akatsu et al. |
| 5,068,490 A | 11/1991 | Eaton |
| 5,175,225 A | 12/1992 | Ruhe, Jr. |
| 5,191,044 A | 3/1993 | Rath et al. |
| 5,192,335 A | 3/1993 | Cherpeck |
| 5,254,649 A | 10/1993 | Miln et al. |
| 5,254,784 A | 10/1993 | Nurminen et al. |
| 5,286,823 A | 2/1994 | Rath |
| 5,300,701 A | 4/1994 | Cherpeck |
| 5,408,018 A | 4/1995 | Rath |
| 5,439,991 A | 8/1995 | Colman et al. |
| 5,448,001 A | 9/1995 | Baird |
| 5,563,313 A | 10/1996 | Chung et al. |
| 5,710,225 A | 1/1998 | Johnson et al. |
| 5,731,379 A | 3/1998 | Kennan et al. |
| 5,733,993 A | 3/1998 | Yu et al. |
| 5,767,334 A | 6/1998 | Nissfolk et al. |
| 5,779,742 A | 7/1998 | Baker |
| 5,792,729 A | 8/1998 | Harrison et al. |
| 5,811,616 A | 9/1998 | Holub et al. |
| 5,814,706 A | 9/1998 | Yu et al. |
| 5,910,550 A | 6/1999 | Rath |
| 5,962,604 A | 10/1999 | Rath |
| 6,132,827 A | 10/2000 | Miro |
| 6,361,856 B1 | 3/2002 | Wakai et al. |
| 6,384,154 B1 | 5/2002 | Sigwart et al. |
| 6,562,913 B1 * | 5/2003 | Baxter, Jr. et al. ............ 526/64 |

* cited by examiner

PROCESS FOR PRODUCING HIGH VINYLIDENE POLYISOBUTYLENE

CROSS REFERENCE TO RELATED APPLICATION

This application is a continuation of copending application Ser. No. 09/515,790 filed Feb. 29, 2000, now U.S. Pat. No. 6,562,913, which in turn claims priority benefits under 35 U.S.C. 119(e) from provisional application Ser. No. 60/154,263, filed on Sep. 16, 1999. The entireties of the disclosures of said U.S. Pat. No. 6,562,913 and said application Ser. No. 60/154,263 are hereby specifically incorporated herein by this specific reference thereto.

BACKGROUND OF THE INVENTION

1. Field of the Invention

The present invention relates to the preparation of polyisobutylene (PIB). In particular the present invention relates to the preparation of highly reactive PIB having a relatively high degree of terminal unsaturation. In this latter regard, the invention provides a novel liquid phase process for the polymerization of isobutylene to prepare highly reactive PIB using a modified $BF_3$ catalyst.

2. The Prior Art Background

The polymerization of isobutylene using Friedel-Crafts type catalysts, including $BF_3$, is a generally known procedure which is disclosed, for example, in "HIGH POLYMERS", Vol. XXIV (J. Wiley & Sons, Inc., New York, 1971), pp. 713 ff. The degree of polymerization of the products obtained varies according to which of the various known polymerization techniques is used. In this latter connection, it is to be understood that the molecular weight of the polymeric product is directly related to the degree of polymerization.

It is also known that PIB may be manufactured in at least two different grades—regular and high vinylidene. Conventionally, these two product grades have been made by different processes, but both often and commonly use a diluted isobutylene feedstock in which the isobutylene concentration may range from 40–60% by weight. More recently it has been noted that at least the high vinylidene PIB may be produced using a concentrated feedstock having an isobutylene content of 90% by weight or more. Non-reactive hydrocarbons, such as isobutane, n-butane and/or other lower alkanes commonly present in petroleum fractions, may also be included in the feedstock as diluents. The feedstock often may also contain small quantities of other unsaturated hydrocarbons such as 1-butene and 2-butene.

Regular grade PIB may range in molecular weight from 500 to 1,000,000 or higher, and is generally prepared in a batch process at low temperature, sometimes as low as −50 to −70° C. $AlCl_3$, $RAlCl_2$ or $R_2AlCl$ are used as catalysts. The catalyst is not totally removed from the final PIB product. Molecular weight may be controlled by temperature since the molecular weight of the product varies inversely with temperature. That is to say, higher temperatures give lower molecular weights. Reaction times are often in the order of hours. The desired polymeric product has a single double bond per molecule, and the double bonds are mostly internal. Generally speaking, at least about 90% of the double bonds are internal and less than 10% of the double bonds are in a terminal position. Even though the formation of terminal double bonds is believed to be kinetically favored, the long reaction times and the fact that the catalyst is not totally removed, both favor the rearrangement of the molecule so that the more thermodynamically favored internal double bond isomers are formed. Regular PIB may be used as a viscosity modifier, particularly in lube oils, as a thickener, and as a tackifier for plastic films and adhesives. PIB can also be functionalized to produce intermediates for the manufacture of detergents and dispersants for fuels and lube oils.

High vinylidene PIB, a relatively new product in the marketplace, is characterized by a large percentage of terminal double bonds, typically greater than 70% and preferentially greater than 80%. This provides a more reactive product, compared to regular PIB, and hence this product is also referred to as highly reactive PIB. The terms highly reactive (HR-PIB) and high vinylidene (HV-PIB) are synonymous. The basic processes for producing HV-PIB all include a reactor system, employing $BF_3$ and/or modified $BF_3$ catalysts, such that the reaction time can be closely controlled and the catalyst can be immediately neutralized once the desired product has been formed. Since formation of terminal double bonds is kinetically favored, short reaction times favor high vinylidene levels. The reaction is quenched, usually with an aqueous base solution, such as, for example, $NH_4OH$, before significant isomerization to internal double bonds can take place. Molecular weights are relatively low. HV-PIB having a number average molecular weight ($M_N$) of about 950–1050 is the most common product. Conversions, based on isobutylene, are kept at 75–85%, since attempting to drive the reaction to higher conversions reduces the vinylidene content through isomerization. Prior U.S. Pat. Nos. 4,152,499 dated May 1, 1979, 4,605,808 dated Aug. 12, 1986, 5,068,490 dated Nov. 26, 1991, 5,191,044 dated Mar. 2, 1993, 5,286,823 dated Jun. 22, 1992, 5,408,018 dated Apr. 18, 1995 and 5,962,604 dated Oct. 5, 1999 are directed to related subject matter.

U.S. Pat. No. 4,152,499 describes a process for the preparation of PIBs from isobutylene under a blanket of gaseous $BF_3$ acting as a polymerization catalyst. The process results in the production of a PIB wherein 60 to 90% of the double bonds are in a terminal (vinylidene) position.

U.S. Pat. No. 4,605,808 discloses a process for preparing PIB wherein a catalyst consisting of a complex of $BF_3$ and an alcohol is employed. It is suggested that the use of such a catalyst complex enables more effective control of the reaction parameters. Reaction contact times of at least 8 minutes are required to obtain a PIB product wherein at least about 70% of the double bonds are in a terminal position.

U.S. Pat. No. 5,191,044 discloses a PIB production process requiring careful pretreatment of a $BF_3$/alcohol complex to insure that all free $BF_3$ is absent from the reactor. The complex must contain a surplus of the complexing agent in order to obtain a product wherein at least about 70% of the double bonds are in a terminal position. The specification broadly suggests that reaction times ranging from 10 seconds to several hours are within the contemplation of the disclosure; however, none of the specific examples reveals the residence time employed. Moreover, there is absolutely no disclosure whatsoever in the '044 patent which correlates reaction time with either the choice of catalyst complexing agent or the formation of terminal double bonds. Additionally, while the '044 patent reference broadly suggests that reaction temperatures may generally be below 0° C., in each of the specific examples, the reaction temperature is −10° C. or lower. And once again there is no disclosure whatsoever in the '044 patent which correlates reaction temperature with either the choice of catalyst complexing agent or the formation of terminal double bonds.

In addition to close control of reaction time, the key to obtaining high vinylidene levels seems to be control of catalyst reactivity. This has been done in the past by complexing $BF_3$ with various oxygenates including sec-butanol and MTBE. One theory is that these complexes are actually less reactive than $BF_3$ itself, disproportionately slowing the isomerization reaction and thus allowing for greater differentiation between the vinylidene forming reaction (polymerization) and the isomerization reaction rates. Mechanisms have also been proposed that suggest the $BF_3$ complexes are non-protonated and thus are not capable of isomerizing the terminal double bond. This further suggests that water (which can preferentially protonate $BF_3$) must generally be excluded from these reaction systems. In fact, prior publications describing preparation of PIB using $BF_3$ complexes teach low water feed (less than 20 ppm) is critical to formation of the high vinylidene product.

HV-PIB is increasingly replacing regular grade PIB for the manufacture of intermediates, not only because of higher reactivity, but also because of developing requirements for "chloride free" materials in the final product applications. Important PIB derivatives are PIB amines, PIB alkylates and PIB maleic anhydride adducts.

PIB amines can be produced using a variety of procedures involving different PIB intermediates which provide a reactive site for subsequent amination. These intermediates may include, for example, epoxides, halides, maleic anhydride adducts, and carbonyl derivatives. Reference to HV-PIB as "highly reactive" is relative to regular grade PIB. HV-PIB is still not, in absolute terms, highly reactive toward formation of some of these intermediates. Other classes of compounds, polyethers for example, can be much more reactive in the formation of amines and amine intermediates. Amines derived from polyethers are known as polyether amines (PEA's) and are competitive products to PIB amines.

The use of HV-PIB as an alkylating agent for phenolic compounds, is triggered by the higher reactivity and higher yields achievable with HV-PIB. These very long chain alkyl phenols are good hydrophobes for surfactants and similar products.

The largest volume PIB derivatives are the PIB-maleic anhydride reaction products. HV-PIB is reacted with maleic anhydride through the double bond giving a product with anhydride functionality. This functionality provides reactivity for the formation of amides and other carboxylate derivatives. These products are the basis for most of the lube oil detergents and dispersants manufactured today. As mentioned above, PIB-maleic anhydride products can also be used as intermediates in the manufacture of PIB amine fuel additives.

SUMMARY OF THE INVENTION

The present invention provides a novel process for the efficient and economical production of HV-PIB. Generally speaking, the invention provides a HV-PIB production process wherein the polymerization reaction takes place at higher temperatures and at lower reaction times than were thought possible in the past. In particular, the present invention provides a liquid phase polymerization process for preparing low molecular weight, highly reactive polyisobutylene. Generally speaking, the process may involve cationic polymerization. However, under some conditions the polymerization reaction may be covalent. Particularly the latter may be true when ether is used as a complexing agent. In accordance with the invention, the process includes the provision of a feedstock comprising isobutylene and a catalyst composition comprising a complex of $BF_3$ and a complexing agent. The feedstock and the catalyst composition are introduced either separately or as a single mixed stream into a residual reaction mixture in a reaction zone. The residual reaction mixture, the feedstock and the catalyst composition are then intimately intermixed to present an intimately intermixed reaction admixture in said reaction zone. The reaction admixture is maintained in its intimately intermixed condition and kept at a temperature of at least about 0° C. while the same is in said reaction zone, whereby the isobutylene in the reaction admixture is caused to undergo polymerization to form a polyisobutylene product. A product stream comprising a low molecular weight, highly reactive polyisobutylene is then withdrawn from the reaction zone. The introduction of the feedstock into said reaction zone and the withdrawal of the product stream from the reaction zone are controlled such that the residence time of the isobutylene undergoing polymerization in the reaction zone is no greater than about 4 minutes. In accordance with the invention, it is possible to conduct the reaction so that the residence time is no greater than about 3 minutes, no greater than about 2 minutes, no greater than about 1 minute, and ideally, even less than 1 minute.

In accordance with the concepts and principles of the invention, the process may be conducted in a manner such that the polyisobutylene thus produced has a number average molecular weight in the range of from about 350 to about 5000, in the range of from about 600 to about 4000, in the range of from about 700 to about 3000, in the range of from about 800 to about 2000, and ideally in the range of from about 950 to about 1050. In accordance with the invention, it is possible to so control the process that a particular molecular weight, such as for example, a number average molecular weight of about 1000, may be achieved.

A major purpose of the invention is to provide a process which may be controlled sufficiently to insure the production of a polyisobutylene product having a vinylidene content of at least about 70%. More preferably the PEB product may have a vinylidene content of at least about 80%. Vinylidene contents of at least about 90% may also be achieved through the use of the invention.

The complexing agent used to complex with the $BF_3$ catalyst may desirably be an alcohol, and preferably may be a primary alcohol. More preferably the complexing agent may comprise a $C_1$–$C_8$ primary alcohol and ideally may be methanol.

To achieve the desired results of the invention, the molar ratio of $BF_3$ to complexing agent in the complex may range from approximately 0.5:1 to approximately 5:1. Preferably the molar ratio of $BF_3$ to complexing agent in the complex may range from approximately 0.5:1 to approximately 2:1. Even more preferably the molar ratio of $BF_3$ to complexing agent in the complex may range from approximately 0.5:1 to approximately 1:1, and ideally, the molar ratio of $BF_3$ to complexing agent in the complex may be approximately 1:1.

According to the principles and concepts of the invention, it is preferred that from about 0.1 to about 10 millimoles of $BF_3$ may be introduced into the reaction admixture with the catalyst composition for each mole of isobutylene introduced into the admixture in the feedstock. Even more preferably, from about 0.5 to about 2 millimoles of $BF_3$ may be introduced into the reaction admixture with said catalyst composition for each mole of isobutylene introduced into the admixture in the feedstock.

The invention provides a process whereby the polydispersity of said polyisobutylene may be no more than about 2.0, and desirably may be no more than about 1.65. Ideally, the polydispersity may be in the range of from about 1.3 to about 1.5.

In accordance with one preferred aspect of the invention, the reaction zone may comprise a loop reactor wherein the reaction admixture is continuously recirculated at a first volumetric flow rate, and said feedstock and said catalyst composition are continuously introduced at a combined second volumetric flow rate. The ratio of said first volumetric flow rate to said second volumetric flow rate may desirably range from about 20:1 to about 50:1, may preferably range from about 25:1 to about 40:1 and ideally may range from about 28:1 to about 35:1. In order to achieve the benefits of the invention, the ratio of said first volumetric flow rate to said second volumetric flow rate may preferably be such that the concentrations of ingredients in the reaction admixture remain essentially constant and/or such that essentially isothermal conditions are established and maintained in said reaction admixture.

The feedstock and the catalyst composition may be premixed and introduced into the reaction zone together as a single stream at said second volumetric flow rate. Alternatively, the feedstock and the catalyst composition may be introduced into the reaction zone separately as two respective streams, the flow rates of which together add up to said second volumetric flow rate.

To achieve the desired results of the invention, the reactor configuration, the properties of the reaction mixture, and the first volumetric flow rate may be such that turbulent flow is maintained in said reaction zone. In particular, the system may be such that a Reynolds number of at least about 2000 is achieved and maintained in said reaction zone. The system may also be such that a heat transfer coefficient (U) of at least about 50 Btu/min ft$^2$ ° F. is achieved and maintained in said reaction zone. To this end, the reactor may preferably be the tube side of a shell-and-tube heat exchanger.

In further accordance with the concepts and principles of the invention, the feed stock may generally comprise at least about 30% by weight of isobutylene, with the remainder being non-reactive hydrocarbon diluents.

In a more specific sense, the invention may provide a liquid phase polymerization process for preparing polyisobutylene having a number average molecular weight in the range of from about 500 to about 5000 and a vinylidene content of at least 70%. The process may comprise providing both a feedstock comprising isobutylene and a separate catalyst composition made up of a complex of $BF_3$ and a $C_1$ to $C_8$ primary alcohol. The molar ratio of $BF_3$ to alcohol in said complex may desirably be in the range of from about 0.5:1 to about 2:1. The feedstock and the catalyst composition may be introduced separately or together as a single stream into a residual reaction mixture in a reaction zone, and the residual reaction mixture, the feedstock and the catalyst composition may be intimately intermixed to present an intimately intermixed reaction admixture in said reaction zone. The introduction of the catalyst complex into the reaction admixture may preferably be controlled so that about 0.1 to about 10 millimoles of $BF_3$ are introduced for each mole of isobutylene introduced with the feedstock. The intimately intermixed condition of the reaction admixture should preferably be maintained and the temperature thereof kept at about 0° C. or above while the admixture is in the reaction zone, whereby the isobutylene in the admixture undergoes polymerization to form said polyisobutylene. Thereafter, a product stream comprising the polyisobutylene product may be withdrawn from the reaction zone. The introduction of said feedstock into the reaction zone and the withdrawal of the product stream from the reaction zone may preferably be such that the residence time of the isobutylene undergoing polymerization in the reaction zone is no greater than about 4 minutes.

Even more desirably, the invention provides a liquid phase polymerization process for preparing polyisobutylene having a number average molecular weight in the range of from about 950 to about 1050, a polydispersity within the range of from about 1.3 to about 1.5, and a vinylidene content of at least about 80%. In accordance with this preferred aspect of the invention, the process comprises providing both a feedstock made up of at least about 40% by weight isobutylene and a separate catalyst composition made up of a complex of $BF_3$ and methanol, wherein the molar ratio of $BF_3$ to methanol in the complex ranges from about 0.5:1 to about 1:1. The feedstock and the catalyst composition are introduced either separately or together into a residual reaction mixture in a reaction zone. The residual reaction mixture, the feedstock and the catalyst composition are intimately intermixed by turbulent flow within said reaction zone, whereby an intimately intermixed reaction admixture is present in the reaction zone. Preferably, the catalyst complex is introduced into the reaction admixture at a rate such that about 0.5 to about 2 millimoles of $BF_3$ are introduced for each mole of isobutylene introduced in the feedstock. The intimately intermixed condition of the reaction admixture is maintained and the temperature thereof is kept at about 0° C. or more while the same is in said reaction zone, whereby the isobutylene therein is caused to undergo polymerization to form said polyisobutylene. A product stream comprising said polyisobutylene is withdrawn from said reaction zone. In accordance with the invention, the introduction of feedstock into the reaction zone and the withdrawal of product stream therefrom are controlled such that the residence time of the isobutylene undergoing polymerization in the reaction zone is within the range of from about 45 to about 90 seconds.

DETAILED DESCRIPTION OF THE PREFERRED EMBODIMENTS

Figure 1:
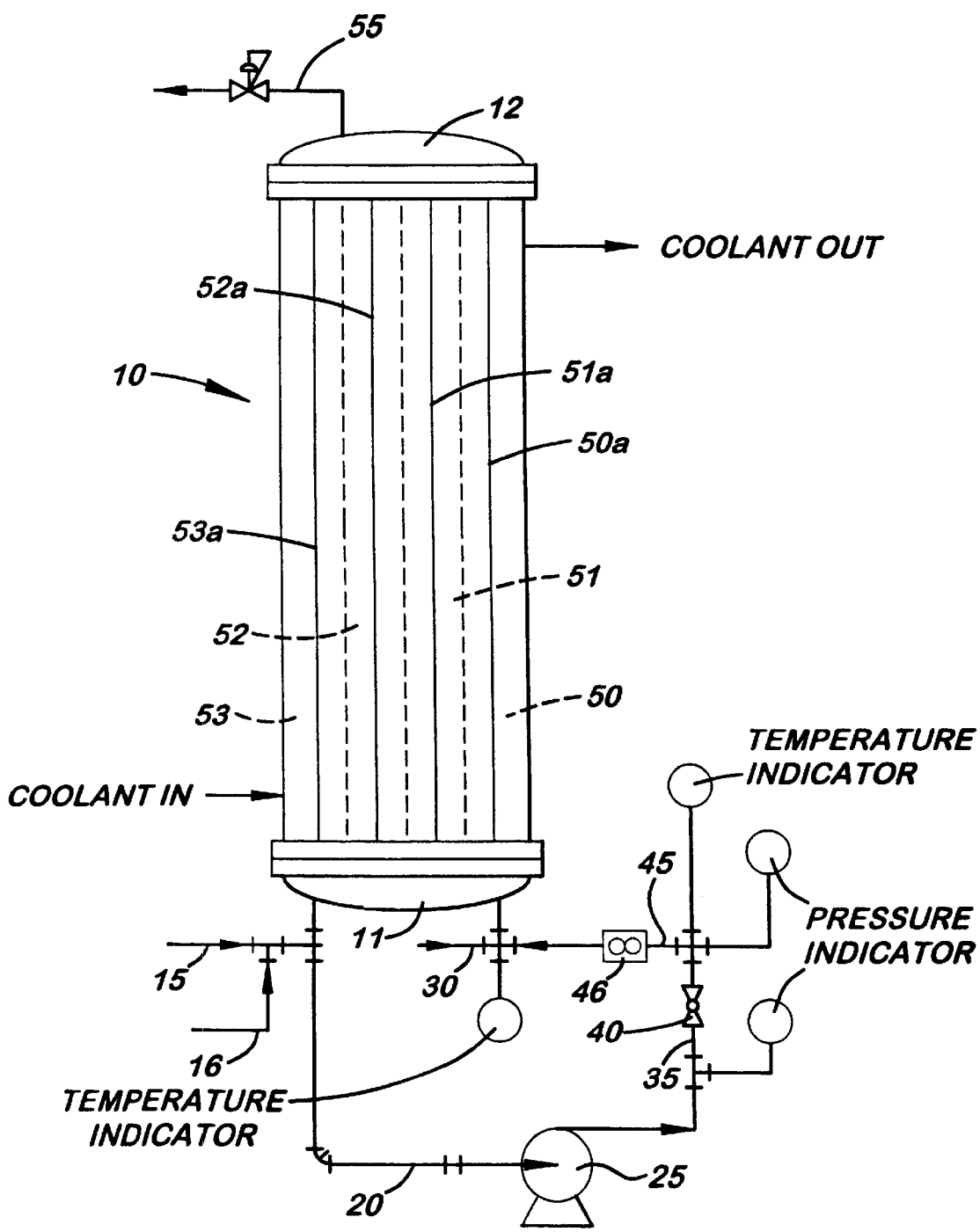
FIG. 1 is a schematic illustration of a reactor for carrying out the improved process of the invention.

The present invention provides an improved liquid phase process for the efficient and economical production of PIB. In accordance with the invention, an isobutylene containing feedstock stream is contacted in a reaction zone with a catalyst which facilitates the polymerization reaction. Appropriate reaction conditions are provided in the reaction zone. After an appropriate residence time, a PIB containing product stream is withdrawn from the reaction zone. As mentioned above, many techniques for conducting the reaction are known; however, from a commercial viewpoint it is always desirable to improve the efficiency and economics of the process. With the foregoing in mind, the present invention provides an improved PIB producing process which may be easily controlled and manipulated to efficiently and economically provide a relatively low molecular weight, highly reactive PIB product.

The improved process of the present invention features the use of a $BF_3$ catalyst which desirably may be complexed with a complexing agent which appropriately alters the performance of the catalyst. Many other potentially useful catalysts are known to those of ordinary skill in the related art field. In particular, many useful catalysts are described in the prior patents referenced above. The complexing agent for the catalyst, and in particular for the $BF_3$ catalyst, may be any compound containing a lone pair of electrons, such as, for example, an alcohol, an ester or an amine. For purposes of the present invention, however, the complexing agent may be an alcohol, desirably a primary alcohol, preferably a $C_1$–$C_8$ primary alcohol and ideally methanol.

The molar ratio of $BF_3$ to complexing agent in the catalyst composition should generally be within the range of from approximately 0.5:1 to approximately 5:1, desirably within the range of from approximately 0.5:1 to approximately 2:1, and preferably within the range of from approximately 0.5:1 to approximately 1:1. Ideally, the catalyst composition may simply be a 1:1 complex of $BF_3$ and methanol. In some preferred embodiments of the invention, the molar ratio of $BF_3$ to complexing agent in said complex may be approximately 0.75:1.

The temperature in the reaction zone may generally and preferably be greater than 0° C., the reactor residence time may generally and preferably be less than 4 minutes and the desired vinylidene (terminal unsaturation) content in the product may preferably and generally be greater than about 70%. With these parameters, it is possible to operate the process so as to achieve efficiencies and economies not previously thought to be available. In accordance with the present invention, the catalyst concentration and the $BF_3$/complex ratio may be manipulated as required to achieve the desired 70% vinylidene content with a reaction temperature greater than 0° C. and a reactor residence time of less than 4 minutes. Generally speaking, the amount of the $BF_3$ catalyst introduced into the reaction zone should be within the range of from about 0.1 to about 10 millimoles for each mole of isobutylene introduced into the reaction zone. Preferably, the $BF_3$ catalyst may be introduced at a rate of about 0.5 to about 2 millimoles per mole of isobutylene introduced in the feedstock.

The process itself includes steps resulting in the intimate mixing of the isobutylene containing reactant stream and the catalyst complex and/or removal of heat during the reaction. The intimate mixing may desirably be accomplished by turbulent flow. Turbulent flow also enhances heat removal. These conditions separately or together permit the higher operating temperatures (e.g. >0° C.) and the shorter reactor residence times (e.g. <4 minutes) provided by the invention. These important parameters may be achieved by causing the catalyzed reaction to take place in the tubes of a shell-and-tube heat exchanger at a flow rate which results in turbulent flow.

Many potentially valuable reactors are well known to the routineers in the art to which the invention pertains. However, for purposes of one preferred embodiment of the invention, the reactor may be a four-pass shell-and-tube heat exchanger as shown in FIG. 1 where it is identified by the numeral 10. The reactor may, for example, have 80 ⅜-inch tubes with a wall thickness of 0.022 inch, each thereby providing an internal tube diameter of 0.331 inch. The reactor may be three feet long and may have internal baffling and partitions to provide 4 passes with 20 tubes per pass. Such construction is well known in the heat exchanger and reactor arts and no further explanation is believed necessary.

In operation, the isobutylene containing feedstock enters the reactor system through pipe 15 which is preferably located adjacent the bottom head 11 of reactor 10. Pipe 15 directs the feed stock into the suction line 20 of a recirculation pump 25. The catalyst complex may be injected into the reactor circulation system through pipe 30 located adjacent bottom head 11 of reactor 10. It should be noted here, that in accordance with the principles and concepts of the invention, the catalyst complex could just as well be injected separately into the reactor, in which case a separate catalyst pump might be required.

A catalyst modifier may be introduced into the reactor circulation system. Desirably this may be accomplished by adding the catalyst modifier to the feedstock via pipe 16 before the feedstock enters the reactor system. The purpose of the modifier is to assist in controlling the vinylidene content of the PIB product. The catalyst modifier may be any compound containing a lone pair of electrons such as an alcohol, an ester or an amine. However, it is pointed out in this regard that if the amount of modifier is too great, the same may actually kill the catalyst. The feedstock containing the modifier enters the reactor system at the suction line 20 of the circulation pump 25. The catalyst complex composition enters the reactor system via line 30 at a location downstream from pump 25 and adjacent the first pass as shown in FIG. 1. The catalyst complex is preferably a methanol/$BF_3$ complex with a 1:1 molar ratio of $BF_3$ to methanol. The amount of modifier added via line 16 may vary from 0 to about 1 mole for each mole of $BF_2$ added as a complex via line 30.

Circulation pump 25 pushes the reaction mixture through line 35, control valve 40 and line 45 into the bottom head 11 of the reactor 10. A flow meter 46 may be positioned in line 45 as shown. The reaction mixture travels upwardly through pass 50, downwardly through pass 51, upwardly through pass 52 and downwardly through pass 53. As explained previously, each pass 50, 51, 52 and 53 may preferably include 20 separate tubes. For clarity, only a respective single tube is illustrated schematically in each pass in FIG. 1. These tubes are identified by the reference numerals 50a, 51a, 52a and 53a. However, as discussed above, each pass will consist of a plurality, for example, 20 of these individual tubes.

It is to be noted here, that the reaction mixture should preferably be circulated through the tubes 50a, 51a, 52a, 53a of the reactor at a flow rate sufficient to obtain turbulent flow, whereby to achieve intimate intermixing between the catalyst complex and the reactants and a heat transfer coefficient appropriate to provide proper cooling. In this regard, the flow rate, the reaction mixture properties, the reaction conditions and the reactor configuration should be appropriate to produce a Reynolds number (Re) in the range of from about 2000 to about 3000 and a heat transfer coefficient (U) in the range of from about 50 to about 150 Btu/min ft$^2$ ° F. in the tubes of the reactor. Such parameters may generally be obtained when the linear flow rate of a typical reaction mixture through a tube having an internal diameter of 0.331 inch is within the range of from about 6 to 9 feet per second.

The circulating reaction mixture leaves reactor 10 via suction line 20. The circulating reaction mixture is preferably maintained at steady state equilibrium conditions so that the reactor, in essence, is a Continuous Stirred Tank Reactor (CSTR). The reactor may also be of the type which is sometimes referred to as a loop reactor. With this system, which is only a preferred system since there are many other arrangements which would be apparent to those of ordinary skill in the art, the flow rate of the reactant mixture in the reactor may be adjusted and optimized independently of feed stock introduction and product removal rates so as to achieve thorough intermixing of the catalyst complex and the reactants and appropriate temperature control.

A product exit line 55 may preferably be provided in top head 12 at a point which is approximately adjacent the transition zone between the third and fourth passes. Such positioning may be desirable to avoid any potential for loss of unreacted isobutylene. Moreover, the positioning of the exit line 55 should be appropriate to facilitate bleeding of gas from the reactor during startup. A coolant may desirably be circulated on the shell side of the reactor at a rate to remove heat of reaction and maintain the desired temperature in the reactor.

The product exiting the system via line 55 should be quenched immediately with a material capable of killing the catalyst, such as, for example, ammonium hydroxide. Thus, any potential rearrangement of the polymer molecule which would shift the double bond away from the terminal position is minimized. The high vinylidene isobutylene product may then be directed to a work up system (not shown) where catalyst salts may be removed and the isobutylene product separated from unreacted isobutylene and other undesirable contaminants such as diluents, etc. These latter materials may then be recycled or diverted for other uses employing known methodology.

With the described recirculation system, the rate of feedstock introduction into the reaction mixture and the rate of product removal are each independent of the circulation rate. As would be appreciated by those of ordinary skill in the art, the number of passes through the reactor and the size and configuration of the latter are simply matters of choice. The feedstock and product withdrawal flow rates may preferably be chosen such that the residence time of the reaction mixture within the reactor is 4 minutes or less, desirably 3 minutes or less, preferably 2 minutes or less, even more preferably 1 minute or less, and ideally less than 1 minute. From a commercial operating viewpoint, the flow rate should be such that the residence time of the reaction mixture in the reactor is within the range of from about 45 to about 90 seconds. In connection with the foregoing, the residence time is defined as the total reactor system volume divided by the volumetric flow rate.

The recirculation flow rate, that is the flow rate of the reaction mixture in the system induced by the recirculation pump 25, is controlled, as described above, to achieve appropriate turbulence and/or heat transfer characteristics. This recirculation flow rate is often a function of the system itself and other desired process conditions. For the system described above, the ratio of the recirculation flow rate to the incoming feedstock flow rate (recycle ratio) should generally be maintained in the range of from about 20:1 to about 50:1, desirably in the range of from about 25:1 to about 40:1, and ideally in the range of from about 28:1 to about 35:1. In particular, in addition to causing turbulence and providing an appropriate heat transfer coefficient, the recirculation flow rate of the reaction mixture should be sufficient to keep the concentrations of the ingredients therein essentially constant and/or to minimize temperature gradients within the circulating reaction mixture whereby essentially isothermal conditions are established and maintained in the reactor.

As mentioned above, the recycle ratios generally should be in the range of from about 20:1 to about 50:1. Higher recycle ratios increase the degree of mixing and the reactor approaches isothermal operation leading to narrower polymer distributions. Lower recycle ratios decrease the amount of mixing in the reactor, and as a result, there is a greater discrepancy in the temperature profiles. As the recycle ratio approaches zero, the design equations for the reactor reduce to those for a plug flow reactor model. On the other hand, as the recycle ratio approaches infinity, the modeling equations reduce to those for a CSTR. When CSTR conditions are achieved, both temperature and composition remain constant and the composition of the product stream leaving the reactor is identical to the composition of the reaction mixture recirculating in the reactor.

Needless to say, after equilibrium has been established, as feedstock enters the system, an equal volume of product is pushed out of the reactor loop. Under CSTR conditions, the point at which the product stream is withdrawn is independent of reactor geometry. However, the top of the third pass was chosen so any air or non-condensable species in the reactor at start-up may conveniently be purged. Also, it is preferred that the withdrawal point be as far as possible from the point where fresh feedstock is introduced into the system just to make sure that conditions within the reactor have achieved steady-state operation and are therefore as stable as possible The feedstock entering the system through line 15 may be any isobutylene containing stream such as, but not limited to, isobutylene concentrate, dehydro effluent, or a typical raff-1 stream. These materials are described respectively below in Tables 1, 2 and 3.

TABLE 1

Isobutylene Concentrate

| Ingredient | Weight % |
|---|---|
| $C_3s$ | 0.00 |
| I-butane | 6.41 |
| n-butane | 1.68 |
| 1-butene | 1.30 |
| I-butene | 89.19 |
| trans-2-butene | 0.83 |
| cis-2-butene | 0.38 |
| 1,3-butadiene | 0.21 |

TABLE 2

Dehydro Effluent

| Ingredient | Weight % |
|---|---|
| $C_3s$ | 0.38 |
| I-butane | 43.07 |
| n-butane | 1.29 |
| 1-butene | 0.81 |
| I-butene | 52.58 |
| trans-2-butene | 0.98 |
| cis-2-butene | 0.69 |
| 1,3-butadiene | 0.20 |

TABLE 3

Raff-1

| Ingredient | Weight % |
|---|---|
| $C_3s$ | 0.57 |
| I-butane | 4.42 |
| n-butane | 16.15 |
| 1-butene | 37.22 |
| I-butene | 30.01 |
| trans-2-butene | 8.38 |
| cis-2-butene | 2.27 |
| 1,3-butadiene | 0.37 |
| MTBE | 0.61 |

For commercial and process economies, the isobutylene content of the feedstock generally should be at least about 30 weight %, with the remainder comprising one or more non-reactive hydrocarbon, preferably alkane, diluents.

The desired product is a relatively low molecular weight, highly reactive polyisobutylene. Thus, the polyisobutylene leaving the reactor by way of line 55 should have a number average molecular weight which is less than about 10,000. Generally speaking, the produced isobutylene should have a number average molecular weight within the range of from about 500 to about 5000, desirably from about 600 to about 4000, preferably from about 700 to about 3000, even more preferably from about 800 to about 2000, and ideally from about 950 to about 1050. By carefully controlling the various parameters of the process, it might even be possible to produce a product wherein the number average molecular weight is consistent at some desired number, for example, 1000.

The polydispersity of the PIB may also be important. The term polydispersity refers to the molecular weight distribution in a given polymer product and generally is defined as the ratio of the molecular weight of the highest molecular weight molecule to the molecular weight of the lowest molecular weight molecule. Polydispersity may be controlled by carefully maintaining constant monomer concentrations and isothermal conditions within the reaction mixture. Generally speaking, it is desirable that the polydispersity be as low as possible in order to diminish the content of unwanted relatively low or high molecular weight polyisobutylenes in the product and thus improve the quality of the latter. By following the concepts and principles of the present invention, it has been found that the polydispersity of the product may be controlled at no more than about 2.0. Preferably, through the use of the invention, a polydispersity of no more than about 1.65 may be achieved. Even more desirably, the polydispersity may be controlled so as to be within the range of from about 1.3 to about 1.5.

The polyisobutylene product obtained through the use of the present invention should generally have a terminal (vinylidene) unsaturation content of at least about 70%. That is to say, at least about 70% of the double bonds remaining in the polymerized product should preferably be in a terminal position. Ideally the vinylidene content should be no less than about 80% or even higher. However, vinylidene content is indirectly related to conversion rates. That is to say, the higher the conversion rate, the lower the vinylidene content. Moreover, vinylidene content is directly related in the same way to molecular weight. Accordingly, in each process a balance is required between molecular weight, conversion rate and vinylidene content.

EXAMPLE 1

Using the principles and concepts of the invention, a reactor such as the reactor illustrated in FIG. 1, was used to produce a low molecular weight, highly reactive polyisobutylene. The feedstock was essentially the same as shown above in Table 1, and the coolant circulated on the shell side of the reactor was a mixture of 35 weight % methanol and 65 weight % water. The inlet coolant temperature was 32° F. A 1:1 $BF_3$/methanol complex catalyst was used and the following observations were made:

| | |
|---|---|
| Feedstock flow rate | 1.7 gpm |
| Recirculation flow rate | 50 gpm |
| Feedstock density | 5 lb/gal |
| Conversion | 63 wt % |
| Concentration of isobutylene in feedstock | 92 wt % |
| $\Delta H_{reaction}$ | 398 Btu/lb |
| $\mu$ reaction mixture | 4.5 centipoise = 0.0030 lb/ft sec |
| Cp of reaction mixture | 0.46 Btu/lb ° F. |

-continued

| | |
|---|---|
| Reaction effective density | 44.9 lb/ft$^3$ |
| Thermal conductivity | 0.075 Btu/hr ft ° F. |
| Total volume of reactor recirculation system | 390.2 in$^3$ |
| Residence time | 59.6 seconds |
| Linear velocity inside tubes | 9.3 ft/sec |
| Reynolds number | 3180 |
| Surface area of tubes | 23.6 ft$^2$ |
| Heat generated | 1961 Btu/min |
| $\Delta T_{lm}$ | 37.3° F. |
| Heat flux | 83.2 Btu/min ft$^2$ |
| U | 133.7 Btu/min ft$^2$ ° F. |
| Cp coolant | 0.86 Btu/lb ° F. |
| Density coolant | 7.70 lb/gal |
| Coolant flow rate | 39.3 gpm |
| $\Delta T$ coolant | 8.0° F. |
| Heat removed | 2074 Btu/min |

The composition of the product thus obtained is as set forth below in Table 4.

TABLE 4

Crude Polyisobutylene Product

| Ingredient | Weight % |
|---|---|
| $C_3$s | 0.00 |
| I-butane | 6.41 |
| n-butane | 1.68 |
| 1-butene | 1.30 |
| I-butene | 33.00 |
| trans-2-butene | 0.83 |
| cis-2-butene | 0.38 |
| 1,3-butadiene | 0.21 |
| polyisobutylene | 56.19 |

Again it is to be noted that one of the main objectives in accordance with the invention is to provide a flow rate through the reactor and other parameters such that the reaction mixture is in a generally constant state of turbulent flow during the reaction. Turbulent flow results in a twofold augmentation of the overall process. First, turbulent flow results in intimate intermixing of the contents of the reactor to enhance the kinetics of the reaction. Second, turbulent flow results in an enhancement of the tube side heat transfer coefficient to thereby improve the removal of the heat of the reaction. These results may be achieved by conducting the reaction on the tube side of a shell-and-tube heat exchanger reactor and circulating a coolant on the shell side.

We claim:

1. A liquid phase polymerization process for preparing low molecular weight, highly reactive polyisobutylene, said process comprising:

providing a feedstock comprising isobutylene;

providing a catalyst composition comprising a complex of $BF_3$ and a complexing agent therefor;

introducing said feedstock and said catalyst composition into a residual reaction mixture in a reaction zone;

intimately intermixing said residual reaction mixture, said feedstock and said catalyst composition to present an intimately intermixed reaction admixture in said reaction zone;

maintaining the intimately intermixed reaction admixture in its intimately intermixed condition and keeping it at a temperature of at least about 0° C. while the same is in said reaction zone, to thereby cause the isobutylene therein to undergo polymerization to form said polyisobutylene;

withdrawing a product stream comprising low molecular weight, highly reactive polyisobutylene from said reaction zone; and controlling the introduction of said feedstock into said reaction zone and the withdrawal of said product stream from the reaction zone such that the residence time of the isobutylene undergoing polymerization in the reaction zone is no greater than about 4 minutes.

2. A process as set forth in claim 1, wherein said residence time is no greater than about 3 minutes.

3. A process as set forth in claim 1, wherein said residence time is no greater than about 2 minutes.

4. A process as set forth in claim 1, wherein said residence time is no greater than about 1 minute.

5. A process as set forth in claim 1, wherein said residence time is less than 1 minute.

6. A process as set forth in claim 1, wherein said polyisobutylene in said product stream has a number average molecular weight in the range of from about 350 to about 5000.

7. A process as set forth in claim 1, wherein said polyisobutylene in said product stream has a number average molecular weight in the range of from about 600 to about 4000.

8. A process as set forth in claim 1, wherein said polyisobutylene in said product stream has a number average molecular weight in the range of from about 700 to about 3000.

9. A process as set forth in claim 1, wherein said polyisobutylene in said product stream has a number average molecular weight in the range of from about 800 to about 2000.

10. A process as set forth in claim 1, wherein said polyisobutylene in said product stream has a number average molecular weight in the range of from about 950 to about 1050.

11. A process as set forth in claim 1, wherein said polyisobutylene in said product stream has a number average molecular weight of about 1000.

12. A process as set forth in claim 1, wherein said polyisobutylene in said product stream has a vinylidene content of at least about 70%.

13. A process as set forth in claim 1, wherein said polyisobutylene in said product stream has a vinylidene content of at least about 80%.

14. A process as set forth in claim 6, wherein said polyisobutylene in said product stream has a vinylidene content of at least about 70%.

15. A process as set forth in claim 1, where said complexing agent comprises an alcohol.

16. A process as set forth in claim 15, where said complexing agent comprises a primary alcohol.

17. A process as set forth in claim 16, where said complexing agent comprises a $C_1$–$C_8$ primary alcohol.

18. A process as set forth in claim 17, where said complexing agent comprises methanol.

19. A process as set forth in claim 1, wherein the molar ratio of $BF_3$ to complexing agent in said complex ranges from approximately 0.5:1 to approximately 5:1.

20. A process as set forth in claim 1, wherein the molar ratio of $BF_3$ to complexing agent in said complex ranges from approximately 0.5:1 to approximately 2:1.

21. A process as set forth in claim 1, wherein the molar ratio of $BF_3$ to complexing agent in said complex ranges from approximately 0.5:1 to approximately 1:1.

22. A process as set forth in claim 1, wherein the molar ratio of $BF_3$ to complexing agent in said complex is approximately 1:1.

23. A process as set forth in claim 1, wherein from about 0.1 to about 10 millimoles of $BF_3$ are introduced into said reaction admixture with said catalyst composition for each mole of isobutylene introduced into said admixture in said feedstock.

24. A process as set forth in claim 1, wherein from about 0.5 to about 2 millimoles of $BF_3$ are introduced into said reaction admixture with said catalyst composition for each mole of isobutylene introduced into said admixture in said feedstock.

25. A process as set forth in claim 1, wherein the polydispersity of said polyisobutylene is no more than about 2.0.

26. A process as set forth in claim 1, wherein the polydispersity of said polyisobutylene no more than about 1.65.

27. A process as set forth in claim 1, said reaction zone comprising a loop reactor wherein the reaction admixture is continuously recirculated at a first volumetric flow rate, and said feedstock and said catalyst composition are continuously introduced at a combined second volumetric flow rate.

28. A process as set forth in claim 27, wherein the ratio of said first volumetric flow rate to said second volumetric flow rate is such that the concentrations of ingredients in the reaction admixture remain essentially constant.

29. A process as set forth in claim 27, wherein the ratio of said first volumetric flow rate to said second volumetric flow rate is such that essentially isothermal conditions are established and maintained in said reaction admixture.

30. A process as set forth in claim 27, wherein said feedstock and said catalyst composition are premixed and introduced into the reaction zone together as a single stream at said second volumetric flow rate.

31. A process as set forth in claim 27, wherein said feedstock and said catalyst composition are introduced into the reaction zone separately as two streams, the flow rates of which together add up to said second volumetric flow rate.

32. A process as set forth in claim 27, wherein the reactor configuration, the properties of the reaction mixture, and the first volumetric flow rate are such that turbulent flow is maintained in said reaction zone.

33. A process as set forth in claim 32, wherein a Reynolds number of at least about 2000 is maintained in said reaction zone.

34. A process as set forth in claim 32, wherein the reactor is a tube side of a shell-and-tube heat exchanger.

35. A process as set forth in claim 34, wherein a U of at least about 50 Btu/min ft$^2$ ° F. is maintained in said reaction zone.

36. A process as set forth in claim 35, wherein a Reynolds number of at least about 2000 is maintained in said reaction zone.

37. A process as set forth in claim 1, wherein said feed stock comprises at least about 30% by weight of said isobutylene.

38. A process as set forth in claim 1, wherein said feed stock comprises non-reactive hydrocarbon diluents.

39. A process as set forth in claim 38, wherein said feed stock comprises at least about 30% by weight of said isobutylene with the remainder being said diluents.

40. A liquid phase polymerization process for preparing polyisobutylene having a number average molecular weight in the range of from about 500 to about 5000 and a vinylidene content of at least about 70%, said process comprising:

providing a feedstock comprising isobutylene;

providing a catalyst composition comprising a complex of $BF_3$ and a $C_1$ to $C_8$ primary alcohol wherein the ratio of said $BF_3$ to said alcohol in said complex is in the range of from about 0.5:1 to about 2:1;

introducing said feedstock and said catalyst composition into a residual reaction mixture in a reaction zone;

controlling the amount of catalyst complex introduced into said reaction zone such that about 0.1 to about 10 millimoles of $BF_3$ are introduced for each mole of isobutylene introduced in said feedstock;

intimately intermixing said residual reaction mixture, said feedstock and said catalyst composition to present an intimately intermixed reaction admixture in said reaction zone;

maintaining the intimately intermixed reaction admixture in its intimately intermixed condition and keeping it at a temperature of at least about 0° C. while the same is in said reaction zone, to thereby cause the isobutylene therein to undergo polymerization to form said polyisobutylene;

withdrawing a product stream comprising said polyisobutylene from said reaction zone; and controlling the introduction of said feedstock into said reaction zone and the withdrawal of said product stream from the reaction zone such that the residence time of the isobutylene undergoing polymerization in the reaction zone is no greater than about 4 minutes.

41. A liquid phase polymerization process for preparing polyisobutylene having an average molecular weight in the range of from about 950 to about 1050, a polydispersity within the range of from about 1.3 to about 1.5, and a vinylidene content of at least about 80%, said process comprising:

providing a feedstock comprising at least about 30% by weight isobutylene;

providing a catalyst composition comprising a complex of $BF_3$ and methanol, wherein the ratio of said $BF_3$ to said methanol in said complex is in the range of from about 0.5:1 to about 1:1;

introducing said feedstock and said catalyst composition into a residual reaction mixture in a reaction zone;

controlling the amount of catalyst complex introduced into said reaction zone such that about 0.5 to about 2 millimoles of $BF_3$ are introduced for each mole of isobutylene introduced in said feedstock;

intimately intermixing said residual reaction mixture, said feedstock and said catalyst composition by turbulent flow within said reaction zone, to present an intimately intermixed reaction admixture in said reaction zone;

maintaining the intimately intermixed reaction admixture in its intimately intermixed condition and keeping it at a temperature of at least about 0° C. while the same is in said reaction zone, to thereby cause the isobutylene therein to undergo polymerization to form said polyisobutylene;

withdrawing a product stream comprising said polyisobutylene from said reaction zone; and controlling the introduction of said feedstock into said reaction zone and the withdrawal of said product stream from the reaction zone such that the residence time of the isobutylene undergoing polymerization in the reaction zone is within the inclusive range of from about 45 to about 90 seconds.

42. A process as set forth in claim 1, wherein said reaction zone is the tube side of a shell-and-tube heat exchanger.

43. A process as set forth in claim 27, wherein said reaction zone is the tube side of a shell-and-tube heat exchanger.

44. A process as set forth in claim 40, wherein said reaction zone is the tube side of a shell-and-tube heat exchanger.

45. A process as set forth in claim 41, wherein said reaction zone is the tube side of a shell-and-tube heat exchanger.

46. A process as set forth in claim 26, wherein the polydispersity is in the range of from about 1.3 to about 1.5.

47. A process as set forth in claim 1, wherein the molar ratio of $BF_3$ to complexing agent in said complex is approximately 0.75:1.

48. A process as set forth in claim 1, wherein the polymerization process is a cationic process.

49. A process as set forth in claim 1, wherein the polymerization process is a covalent process.

50. A process as set forth in claim 40, said reaction zone comprising a loop reactor wherein the reaction admixture is continuously recirculated at a first volumetric flow rate, and said feedstock and said catalyst composition are continuously introduced at a combined second volumetric flow rate.

51. A process as set forth in claim 41, said reaction zone comprising a loop reactor wherein the reaction admixture is continuously recirculated at a first volumetric flow rate, and said feedstock and said catalyst composition are continuously introduced at a combined second volumetric flow rate.

52. A process as set forth in claim 1, wherein a catalyst modifier is introduced into said residual reaction mixture in said reaction zone separately from said catalyst composition.

53. A process as set forth in claim 27, wherein a catalyst modifier is introduced into said residual reaction mixture in said reaction zone separately from said catalyst composition.

54. A process as set forth in claim 40, wherein a catalyst modifier is introduced into said residual reaction mixture in said reaction zone separately from said catalyst composition.

55. A process as set forth in claim 41, wherein a catalyst modifier is introduced into said residual reaction mixture in said reaction zone separately from said catalyst composition.

56. A process as set forth in claim 50, wherein a catalyst modifier is introduced into said residual reaction mixture in said reaction zone separately from said catalyst composition.

57. A process as set forth in claim 51, wherein a catalyst modifier is introduced into said residual reaction mixture in said reaction zone separately from said catalyst composition.

58. A process as set forth in claim 52, wherein said catalyst modifier comprises the same composition as said complexing agent.

59. A process as set forth in claim 53, wherein said catalyst modifier comprises the same composition as said complexing agent.

60. A process as set forth in claim 54, wherein said catalyst modifier comprises a $C_1$ to $C_8$ primary alcohol.

61. A process as set forth in claim 55, wherein said catalyst modifier comprises methanol.

62. A process as set forth in claim 56, wherein said catalyst modifier comprises a $C_1$ to $C_8$ primary alcohol.

63. A process as set forth in claim 57, wherein said catalyst modifier comprises methanol.

64. A process as set forth in claim 27, wherein said feed stock comprises at least about 30% by weight of said isobutylene.

65. A process as set forth in claim 40, wherein said feed stock comprises at least about 30% by weight of said isobutylene.

66. A process as set forth in claim 1, wherein said feed stock comprises an isobutylene concentrate.

67. A process as set forth in claim 27, wherein said feed stock comprises an isobutylene concentrate.

68. A process as set forth in claim 40, wherein said feed stock comprises an isobutylene concentrate.

69. A process as set forth in claim 41, wherein said feed stock comprises an isobutylene concentrate.

70. A process as set forth in claim 1, wherein said feed stock comprises a dehydro effluent.

71. A process as set forth in claim 27, wherein said feed stock comprises a dehydro effluent.

72. A process as set forth in claim 40, wherein said feed stock comprises a dehydro effluent.

73. A process as set forth in claim 41, wherein said feed stock comprises a dehydro effluent.

74. A process as set forth in claim 1, wherein said feed stock comprises a raff-1 stream.

75. A process as set forth in claim 27, wherein said feed stock comprises a raff-1 stream.

76. A process as set forth in claim 40, wherein said feed stock comprises a raff-1 stream.

77. A process as set forth in claim 41, wherein said feed stock comprises a raff-1 stream.

* * * * *

UNITED STATES PATENT AND TRADEMARK OFFICE
CERTIFICATE OF CORRECTION

PATENT NO. : 6,683,138 B2
DATED : January 27, 2004
INVENTOR(S) : C. Edward Baxter, Jr. et al.

It is certified that error appears in the above-identified patent and that said Letters Patent is hereby corrected as shown below:

<u>Title page,</u>
Item [60], Related U.S. Application Data, delete "Sep. 19, 1999" and insert -- Sep. 16, 1999 -- therefor.

Signed and Sealed this

Thirtieth Day of November, 2004

JON W. DUDAS
*Director of the United States Patent and Trademark Office*